US010484345B2

(12) United States Patent
Shastry et al.

(10) Patent No.: US 10,484,345 B2
(45) Date of Patent: Nov. 19, 2019

(54) SYSTEM AND METHOD FOR IDENTITY VERIFICATION ACROSS MOBILE APPLICATIONS

(71) Applicant: VISA INTERNATIONAL SERVICE ASSOCIATION, San Francisco, CA (US)

(72) Inventors: Vishwanath Shastry, Mountain View, CA (US); Shalini Mayor, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 825 days.

(21) Appl. No.: 14/813,997

(22) Filed: Jul. 30, 2015

(65) Prior Publication Data

US 2016/0036790 A1 Feb. 4, 2016

Related U.S. Application Data

(60) Provisional application No. 62/031,490, filed on Jul. 31, 2014.

(51) Int. Cl.
*H04L 29/06* (2006.01)
*G06Q 20/32* (2012.01)
(Continued)

(52) U.S. Cl.
CPC ....... *H04L 63/0435* (2013.01); *G06Q 20/102* (2013.01); *G06Q 20/32* (2013.01);
(Continued)

(58) Field of Classification Search
CPC ............... H04L 63/0435; H04L 63/068; H04L 63/0815; H04L 63/0876; G06Q 20/102;
(Continued)

(56) References Cited

U.S. PATENT DOCUMENTS 5,280,527 A 1/1994 Gullman
5,613,012 A 3/1997 Hoffman et al.
(Continued)

FOREIGN PATENT DOCUMENTS

EP 1028401 A2 8/2000
EP 2156397 A1 2/2010
(Continued)

OTHER PUBLICATIONS

Burgess, "What is Apple's iCloud Keychain and how do I use it?", Jan. 14, 2014, New Atlas, pp. 1-6, obtained from https://newatlas.com/apple-icloud-keychain-ios7/30301/.*
(Continued)

*Primary Examiner* — Ashokkumar B Patel
*Assistant Examiner* — Forrest L Carey
(74) *Attorney, Agent, or Firm* — Kilpatrick Townsend & Stockton LLP

(57) ABSTRACT

Embodiments are directed to methods, apparatuses, computer readable media and systems for authenticating a user on a user device across multiple mobile applications. The identity of the user is validated by encoding and subsequently validating cryptographically encrypted data in a shared data store accessible by the mobile applications tied to the same entity. Specifically, the application leverages the authentication process of a trusted mobile application (e.g. a banking mobile application) to authenticate the same user on a untrusted mobile application (e.g. a merchant mobile application).

17 Claims, 6 Drawing Sheets

(51) Int. Cl.
  *H04W 12/06* (2009.01)
  *G06Q 20/36* (2012.01)
  *G06Q 20/38* (2012.01)
  *G06Q 20/40* (2012.01)
  *G06Q 20/10* (2012.01)
  *H04W 12/00* (2009.01)
  *H04W 12/04* (2009.01)

(52) U.S. Cl.
  CPC ........... *G06Q 20/322* (2013.01); *G06Q 20/36* (2013.01); *G06Q 20/382* (2013.01); *G06Q 20/385* (2013.01); *G06Q 20/3821* (2013.01); *G06Q 20/4014* (2013.01); *H04L 63/068* (2013.01); *H04L 63/0815* (2013.01); *H04L 63/0876* (2013.01); *H04W 12/0027* (2019.01); *H04W 12/06* (2013.01); *H04W 12/04* (2013.01)

(58) Field of Classification Search
  CPC ...... G06Q 20/32; G06Q 20/322; G06Q 20/36; G06Q 20/382; G06Q 20/3821; G06Q 20/385; G06Q 20/4014; H04W 12/06; H04W 12/04; H04W 12/0027
  See application file for complete search history.

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |

(56) References Cited

U.S. PATENT DOCUMENTS

| | | |
|---|---|---|
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,111,083 B2 | 8/2015 | Taveau |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,680,942 B2 | 6/2017 | Dimmick |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |

(56) References Cited

U.S. PATENT DOCUMENTS

| | | |
|---|---|---|
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0290376 A1* | 11/2012 | Dryer ................ G06Q 20/3278 705/14.23 |
| 2012/0297446 A1 | 11/2012 | Webb et al. |
| 2012/0300932 A1 | 11/2012 | Cambridge et al. |
| 2012/0300938 A1* | 11/2012 | Kean .................... H04L 9/3234 380/279 |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226812 A1 | 8/2013 | Landrok et al. |
| 2013/0226813 A1 | 8/2013 | Voltz |
| 2013/0226815 A1* | 8/2013 | Ibasco .................. H04L 9/3234 705/71 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |

(56) References Cited

U.S. PATENT DOCUMENTS

| | | |
|---|---|---|
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0164254 A1* | 6/2014 | Dimmick ............ G06Q 20/4012 705/71 |
| 2014/0188586 A1 | 7/2014 | Carpenter et al. |
| 2014/0249945 A1 | 9/2014 | Gauthier |
| 2014/0282983 A1* | 9/2014 | Ju ...................... H04W 12/06 726/8 |
| 2014/0294701 A1 | 10/2014 | Dai et al. |
| 2014/0297534 A1 | 10/2014 | Patterson |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0012990 A1* | 1/2015 | Copsey ............ H04L 63/0815 726/7 |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0339663 A1* | 11/2015 | Lopreiato .......... G06Q 20/3278 705/67 |
| 2015/0356560 A1 | 12/2015 | Shastry et al. |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0197725 A1 | 7/2016 | Hammad |
| 2016/0217461 A1 | 7/2016 | Gaddam et al. |
| 2016/0224976 A1 | 8/2016 | Basu |
| 2016/0269391 A1 | 9/2016 | Gaddam et al. |
| 2016/0301683 A1 | 10/2016 | Narayan |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi |
| 2017/0186001 A1 | 6/2017 | Reed et al. |
| 2017/0201520 A1 | 7/2017 | Chandoor |
| 2017/0220818 A1 | 8/2017 | Nagasundaram et al. |
| 2017/0228723 A1 | 8/2017 | Taylor |
| 2017/0295155 A1 | 10/2017 | Wong et al. |
| 2017/0364903 A1 | 12/2017 | Lopez |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2009/138848 A2 | 11/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |

(56) References Cited

FOREIGN PATENT DOCUMENTS

| | | |
|---|---|---|
| WO | 2013119914 A1 | 8/2013 |
| WO | 2013179271 A2 | 12/2013 |

OTHER PUBLICATIONS

Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
McGuire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-the-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Chipman, et al., U.S. Appl. No. 15/265,282 (Unpublished), Self-Cleaning Token Vault, filed Sep. 14, 2016.
Lopez, et al., U.S. Appl. No. 15/462,658 (Unpublished), Replacing Token on a Multi-Token User Device, filed Mar. 17, 2017.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Kaja, et al., U.S. Appl. No. 15/585,077 (Unpublished), System and Method Using Interaction Token, filed May 2, 2017.
Hammad, U.S. Appl. No. 15/977,921 (Unpublished), Integration of Verification Tokens with Mobile Communication Devices, filed May 11, 2018.
Lopez, et al., U.S. Appl. No. 16/020,796 (Unpublished), Embedding Cloud-Based Functionalities in a Communication Device, filed Jun. 27, 2018.

* cited by examiner

SYSTEM AND METHOD FOR IDENTITY VERIFICATION ACROSS MOBILE APPLICATIONS

CROSS-REFERENCES TO RELATED APPLICATIONS

This application claims benefit under 35 U.S.C. § 119(e) to U.S. Provisional Patent Application No. 62/031,490 filed Jul. 31, 2014 and entitled "System and Method for Identity Verification Across Mobile Applications", the disclosure of which is incorporated by reference herein in their entirety for all purposes.

BACKGROUND

Advances in the capabilities of mobile devices have allowed mobile devices to be used as payment instruments to conduct payment transactions. For example, a mobile device can include mobile payment applications that can be used to conduct a payment transaction. A user having multiple payment applications on a mobile device may need to validate their identity for each one of the mobile applications. For example, the user may wish to use a payment account with multiple applications. Currently, the user needs to validate their identity for each mobile application separately to mitigate the possibility of the payment account being used by an imposter or fraudster.

Embodiments of the present invention address these and other problems individually and collectively.

SUMMARY

Embodiments of the present invention are directed to methods, apparatuses, computer readable media and systems for authenticating a user on a user device across multiple mobile applications. The identity of the user is validated by encoding and subsequently validating cryptographically encrypted data in a shared data store accessible by the mobile applications tied to the same entity. Specifically, the application leverages the authentication process of a trusted mobile application (e.g. a banking mobile application) to authenticate the same user on a untrusted mobile application (e.g. a merchant mobile application).

According to some embodiments, a method includes receiving, at a server computer, user data associated with a user from a first mobile application. The method also includes determining, by the server computer, that the first mobile application is trusted. The server computer authenticates the user based on the user data. The server computer sends a cryptographic key to the mobile application after authenticating the user. An identity verification cryptogram is generated using the cryptographic key. The server computer receives the user data associated with the user and the identity verification cryptogram from a second mobile application. The server computer validates that the identity verification cryptogram is generated using the user data and the cryptographic key sent to the first mobile application. The method further comprises sending a payment token to the second mobile application upon validating the verification cryptogram.

In some embodiments, a server computer comprises a processor and a computer readable medium coupled to the processor. The computer readable medium comprises code, executable by the processor, to implement a method comprising receiving user data associated with a user from a first mobile application. The method also includes determining that the first mobile application is trusted. The method includes authenticating the user based on the user data. The method further includes sending a cryptographic key to the first mobile application after authenticating the user. An identity verification cryptogram is generated using the cryptographic key. The method further includes receiving the user data associated with the user and the identity verification cryptogram from a second mobile application. The method includes validating that the identity verification cryptogram is generated using the user data and the cryptographic key and sending a token to the second mobile application upon validating the verification cryptogram.

According to various embodiments, a method includes authenticating, by a first mobile application on a user device, a user on the user device. The method further includes sending, by the first mobile application on the user device, user data associated with the user to a server computer. The method includes receiving, by the first mobile application on the user device, a cryptographic key from the server computer. The first mobile application on the user device generates an identity verification cryptogram using the cryptographic key and stores the cryptographic key on a cloud storage system of an operating system provider of the user device. The method includes retrieving, by a second mobile application on the user device, the identity verification cryptogram from the cloud storage system. The method further includes sending, by the second mobile application on the user device, the user data associated with the user and the identity verification cryptogram to the server computer. The second mobile application on the user device receives a token from the server computer and completes a transaction with the token.

Another embodiment is directed to apparatuses, systems, and computer-readable media configured to perform the methods described above.

These and other embodiments are described in further detail below.

DETAILED DESCRIPTION

Figure 1A:
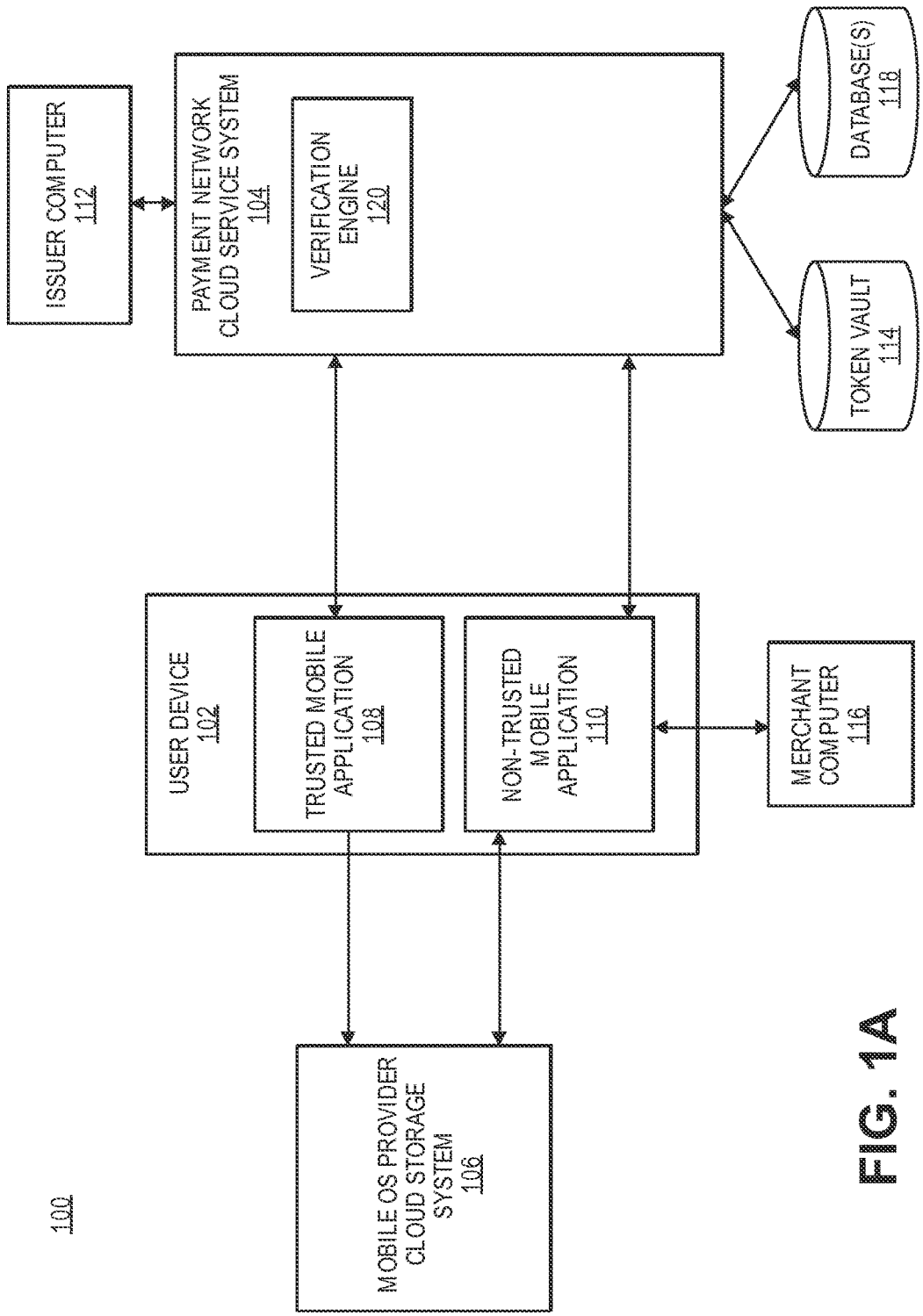
FIG. 1A shows an identity verification system according to various embodiments.

Embodiments of the present invention provides methods, devices, and systems for authenticating a user on a user device across multiple mobile applications. The identity of the user may be validated by encoding and subsequently validating cryptographically encrypted data in a shared data store accessible by the mobile applications tied to the same entity. Specifically, the application leverages the authentication process of a trusted mobile application (e.g. a banking mobile application) on a user device to authenticate the same user on a untrusted mobile application (e.g. a merchant mobile application) on the same user device.

The present invention may include a two-level authentication process. At a first level, a first mobile application on a user device may provide user data (e.g. credentials) including, but not limited to, primary account number (PAN), expiration date of a payment account, user name, billing address and a device identifier to a server computer. According to various embodiments, the server computer may provide and/or support payment network cloud service system. The server computer may verify the information provided by the first mobile application, for example, after checking data in a database. The server computer may also verify that the first mobile application is a trusted mobile application by confirming that the first mobile application and/or the entity provisioning the first mobile application is on a trusted entities list or database. Upon verification, the server computer may send a first cryptographic key and a first payment token to the first (e.g. trusted) mobile application. The trusted mobile application may create an identity verification cryptogram using the first cryptographic key provided by the server computer. The identity verification cryptogram may be stored on a storage accessible by the user device hosting the first mobile application. For example, the identity verification cryptogram may be stored on a cloud storage system of the mobile operating system (OS) provider. In some embodiments, the first mobile application may conduct a transaction with a merchant using the first payment token.

At a second level, a second (e.g. a untrusted) mobile application may retrieve the identity verification cryptogram from the storage. The second mobile application may be provisioned on the same user device. Alternatively, the second mobile application may be provisioned on a different user device tied to the same user account. For example, the first mobile application may be provisioned on a mobile phone of the user and the second mobile application may be provisioned on a tablet of the user, wherein the mobile phone and the tablet may be associated with the same user account. The second mobile application may send the identity verification cryptogram along with the user data to the server computer. The user data sent by the second mobile application may be the same as the user data sent by the first mobile application. As provided above, the user data may include one or more of primary account number (PAN), expiration date of a payment account, user name, billing address and a device identifier. The server computer may validate the identity verification cryptogram using the received user data. That is, the server computer may verify that the received identity verification cryptogram is in fact generated using the received user data. The server computer may provide a second payment token and a second cryptographic key (e.g. a limited use cryptographic key) to the second mobile application. The second mobile application may generate a payment cryptogram using the second cryptographic key. The second mobile application may complete a payment transaction using the second payment token and the payment cryptogram.

Prior to discussing embodiments of the invention, description of some terms may be helpful in understanding embodiments of the invention.

A "user device" is an electronic device that may be transported and/or operated by a user. A user device may provide remote communication capabilities to a network. The user device may be configured to transmit and receive data or communications to and from other devices. In some embodiments, the user device may be portable. Examples of user devices may include mobile phones (e.g., smart phones, cellular phones, etc.), PDAs, portable media players, wearable electronic devices (e.g. smart watches, fitness bands, ankle bracelets, rings, earrings, etc.), electronic reader devices, and portable computing devices (e.g., laptops, netbooks, ultrabooks, etc.). Examples of user devices may also include automobiles with remote communication capabilities.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the server computer may provide and/or support payment network cloud service system.

An "issuer" may typically refer to a business entity (e.g., a bank) that maintains an account for a user that is associated with a portable user device such as an account enrolled in a mobile wallet application installed on a portable user device. An issuer may also issue a token associated with the account to a portable user device.

A "merchant" is typically an entity that engages in transactions and can sell goods or services, or provide access to goods or services.

The term "authentication" and its derivatives may refer to a process by which the credential of an endpoint (including but not limited to applications, people, devices, processes, and systems) can be verified to ensure that the endpoint is who they are declared to be.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "key" may refer to a cryptographic key generated by an entity. A key may be part of a key pair that includes a public key and a private key. The public key may be used for public functions such as encrypting a message to send to the entity or for verifying a digital signature which was supposedly made by the entity. The private key, on the other hand may be used for private functions such as decrypting a received message or applying a digital signature. The public key will usually be authorized by a body known as a Certification Authority (CA) which stores the public key in a database and distributes it to any other entity which requests it. The private key will typically be kept in a secure storage medium and will usually only be known to the entity. However, the cryptographic systems described herein may feature key recovery mechanisms for recovering lost keys and avoiding data loss. Public and private keys may be in any suitable format, including those based on Triple Data Encryption Standard (TDES), Advanced Encryption Standard (AES), Rivest-Shamir-Adlema encryption (RSA), Elliptic Curve Cryptography (ECC), or Secure Hash Algorithm (SHA).

A "cryptogram" may refer to an encrypted representation of some information. A cryptogram can be generated using an encryption key and an encryption processes such as Data Encryption Standard (DES), TDES, or AES. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

A "token" may include a number, string, bit sequence, and/or other data value intended to substitute for or represent account information associated with a user. In some embodiments, there may not be a need to substitute account information such as a primary account number (PAN) with a token—in which case, the account information or PAN can be used as the token. In some embodiments, the token may be derived from or directly related to a PAN or other payment account information (e.g., pseudo PAN, dynamic PAN, obfuscated PAN, partially encrypted PAN, etc.). In some embodiments, the token may include a randomly generated identifier that is associated with the user account.

An "application" may include any software module configured to perform a specific function or functions when executed by a processor of a computer. For example, a "mobile application" may include a software module that is configured to be operated by a mobile device. Applications may be configured to perform many different functions. For instance, a "payment application" may include a software module that is configured to store and provide account credentials for a transaction. A "wallet application" may include a software module with similar functionality to a payment application that has multiple accounts provisioned or enrolled such that they are usable through the wallet application.

A "payment application" or "wallet application" may store credentials (e.g., account identifier, expiration date, card verification value (CVV), etc.) for accounts provisioned onto the user device. The account credentials may be stored in general memory on the mobile device or on a secure trusted execution environment (e.g., a secure element) of the user device. Further, in some embodiments, the account credentials may be stored by a remote computer and the payment/wallet application may retrieve the credentials (or a portion thereof) from the remote computer before/during a transaction. Any number of different commands or communication protocols may be used to interface with the payment application and/or wallet application in order to obtain and use stored credentials associated with each application.

The payment application or wallet application may be configured to provide credentials to an authorized software application or module on a user device. For example, a payment application may be configured to interface with a master applet in order to provide credentials to a mobile application for a transaction. For instance, the payment application may provide a software development kit (SDK) or application programming interface (API) that the master wallet applet may use to interface with the payment application and/or wallet application. The payment application and/or wallet application may be configured to provide the sensitive information in encrypted form using stored encryption keys. Thus, each payment application and/or wallet application may have different commands and/or instructions for accessing the associated credentials stored by the payment/wallet application. For instance, each payment application and/or wallet application may have a different application programming interface (API) with different commands, data requirements, authentication processes, etc., for interacting with other applications operating on the user device. Accordingly, a master wallet applet may include a number of different APIs, one for each of the different payment applications and/or wallet applications that the master wallet applet is configured to interface with.

A "trusted application" may include trusted credentials that have a higher level of confidence than other applications. For example, an account application where the consumer or the consumer account was verified by the issuer during enrollment of the account may be a trusted application. Further, an issuer system was involved or participated in the account provision process of the trusted application. For example, a trusted application may be similar to a traditional payment application that is provisioned into a secure element or other trusted execution environment where multiple parties (including an issuer) are involved in the provisioning process before approval is provided for enrollment, delivery, or provisioning of the payment application. Thus, a trusted application may be provisioned with credentials in which an issuer of the credentials participated during the provisioning of the account.

An "untrusted application" may include credentials that have a lower level of confidence than a trusted application. For example, an account applet where account credentials have been enrolled by a merchant associated with the mobile application without issuer participation or verification of the consumer or the consumer account during provisioning of the account credentials may be an untrusted application. For example, some mobile applications may allow a consumer to add payment credentials of a consumer account without authenticating or contacting an issuer associated with the account of the consumer during enrollment, provisioning, or delivery of the application. Note that an application may be trusted by the user device and the name, "untrusted application" does not indicate that the application is untrusted by the device. Instead, the untrusted application may be trusted by the mobile device but may include information that cannot be confirmed as being trusted because an issuer was not involved in the enrollment or provisioning process of credentials stored by the application.

"Credentials" may include any information that identifies and/or validates the authenticity of a particular entity, article, access right, and/or item. For example, "account credentials" may include any information that identifies an account and allows a processor to verify that a device, person, or entity has permission to access the account. For example, account credentials may include an account identifier (e.g., a PAN), a token (e.g., account identifier substitute), an expiration date, a verification cryptogram, a verification value (e.g., card verification value (CVV)), personal information associated with an account (e.g., address, etc.), an account alias, or any combination thereof. Account credentials may be static or dynamic such that they change over time. Further, in some embodiments, the account credentials may include information that is both static and dynamic. For example, an account identifier and expiration date may be static but an identity verification cryptogram may be dynamic and change for each transaction. Further, in some embodiments, some or all of the account credentials may be stored in a secure memory of a mobile device. The secure memory of the mobile device may be configured such that the data stored in the secure memory may not be directly accessible by outside applications and a payment application associated with the secure memory may be accessed to obtain the credentials stored on the secure memory. Accordingly, a mobile application may interface with a payment application in order to gain access to payment credentials stored on the secure memory.

"Encrypted credentials" may include credentials which have been made unintelligible using a cryptographic key. In some embodiments, encrypted credentials may be generated by a payment application and/or wallet application of a user device using encryption keys (e.g., application public keys) that are used to encrypt stored or received credentials and/or other transaction information for a transaction. For example, a payment application may store a public encryption key (i.e., application public key) that may be paired with a private encryption key (i.e., application private key) that may be securely stored at a secure transaction processing system configured to process a payment transaction. The application private key may be used to decrypt the encrypted credentials and process a transaction using the decrypted account credentials. Additionally, in some embodiments, the application encryption key may include a symmetric encryption key, and thus the keys are not limited to public/private key pairs.

"Decrypted credentials" may include credentials that have been converted from an unintelligible state to an understandable state. For example, decrypted credentials may include the result of applying an application-specific decryption key to encrypted credentials received at a secure transaction processing system to obtain the original comprehensible credentials. Thus, by storing and sending account credentials as encrypted credentials, and decrypting the account credentials at a transaction processing system, the account credential are protected from interception by a malicious third party.

A "merchant application" may include any application associated with a relying party to a transaction. For example, a merchant application may be associated with a particular merchant or may be associated with a number of different merchants and may be capable of identifying a particular merchant (or multiple merchants) which are a party to a transaction. For instance, the merchant application may store information identifying a particular merchant server computer that is configured to provide a sales environment in which the merchant server computer is capable of processing remote transactions initiated by the merchant application. Further, the merchant application may also include a general purpose browser or other software designed to interact with multiple merchant server computers as long as the browser is configured to identify the merchant server computer and process a remote transaction. The merchant application may be installed on general purpose memory of a user device and thus, may be susceptible to malicious attacks, cracks, etc. Accordingly, the merchant application may be treated as an untrusted or unknown application by some payment and/or wallet application within the mobile device.

Embodiments of the present invention described herein include multiple different embodiments that may be combined in any suitable manner, as one of ordinary skill in the art would recognize. For example, in the various embodiments described below, various different parties, merchant applications, mobile payment applications, and transaction processors are described and specific flow diagrams are provided as examples. These examples are provided for illustration of the concepts of the present invention and are meant to be non-limiting. Accordingly, features from the various embodiments may be combined in any suitable manner including using cryptographic keys and verification cryptograms in different configurations than are provided explicitly in each illustrative system described herein.

For example, instead of the untrusted mobile application retrieving the identity verification cryptogram from the mobile OS provider cloud storage system (as described in relation to FIGS. 1 and 4), the payment network cloud service system software development kit (SDK) embedded within the untrusted mobile application may contact the mobile OS provider cloud storage system and/or the payment network cloud service system on behalf of the untrusted mobile application. Similarly, instead of the trusted mobile application providing user data directly to the payment network cloud service system (as described in relation to FIGS. 1-4), the payment network cloud service system SDK embedded within the trusted mobile application may contact the payment network cloud service system on behalf of the trusted mobile application. Accordingly, this is just one example of the various combinations that could be provided according to some embodiments of the present invention which may be described in more detail below.

I. Identity Verification System

Figure 1B:
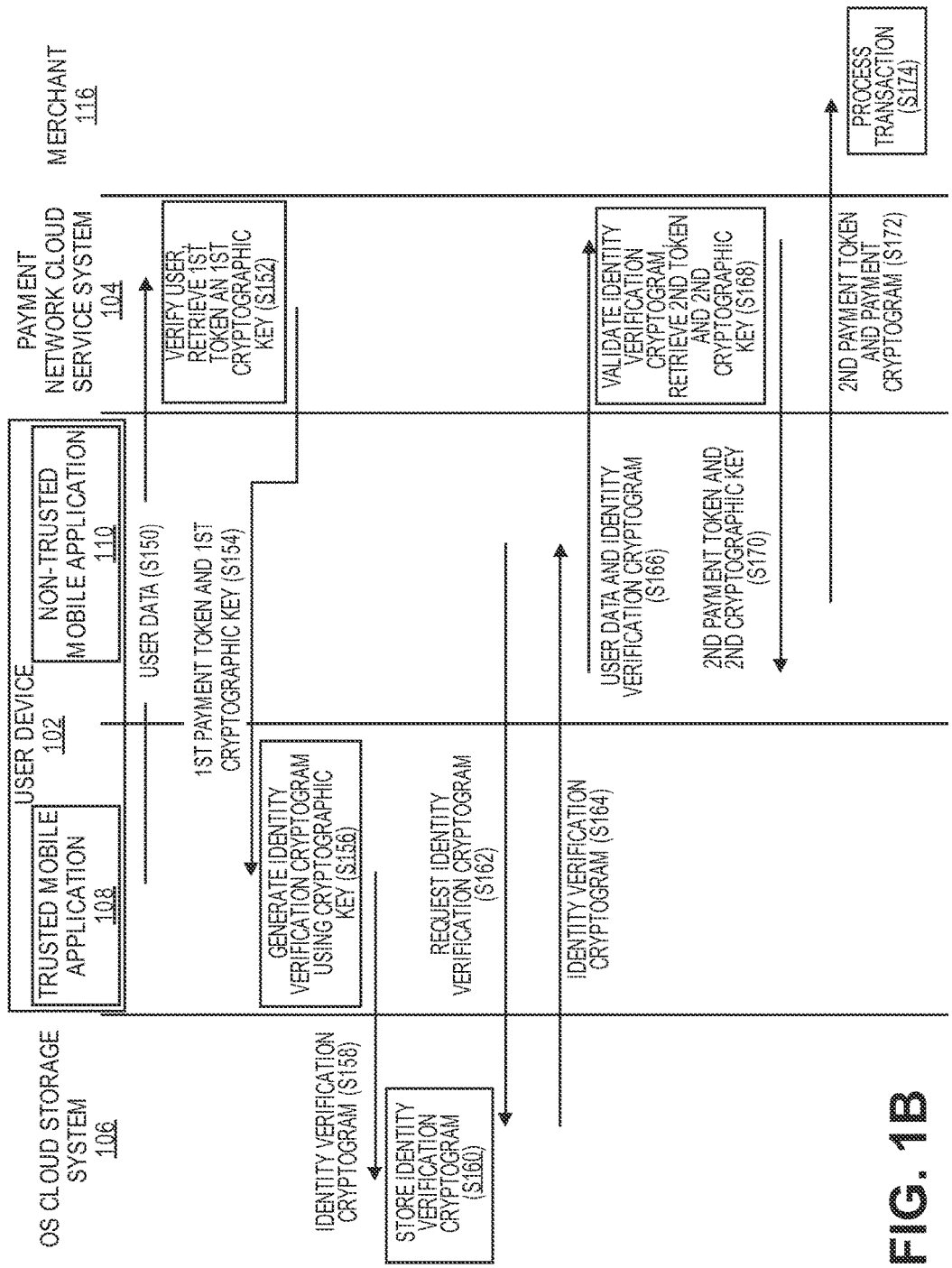
FIG. 1B shoes a flow diagram of steps performed by various entities of the identity verification system illustrated in FIG. 1A according to various embodiments.

FIGS. 1A and 1B will be discussed next in connection with each other. FIG. 1A illustrates an identity verification system 100 and FIG. 1B illustrates a sequence of steps performed by various entities of the identity verification system.

An identity verification system 100 according to various embodiments may include a user device 102, a payment network cloud service system 104 and a shared data store such as a mobile OS provider cloud storage system 106. The user device 102 may have a plurality of mobile applications installed thereon. For example, the user device 102 may include a trusted mobile application 108, such as a banking mobile application, and a untrusted mobile application 110, such as a merchant mobile application. The trusted mobile application 108 and/or the untrusted mobile application 110 may be in communication with a merchant computer 116 to conduct a transaction.

The user of the user device 102 may authenticate himself/herself to the trusted mobile application 108 by, for example, entering a pin code to the user device 102 or any other authentication means. The trusted mobile application 108 may provide the account credentials (i.e. user data) such as the primary account number (PAN), the expiration date, the name on the account, the billing address, the device identifier and the like to the payment network cloud service system 104 (step S150 in FIG. 1B). A verification engine 120 of the payment network cloud service system 104 may verify the information provided by the trusted mobile application 108 and ensure that the trusted mobile application 108 is in fact a trusted application (step S152 in FIG. 1B). For example, the payment network cloud service system 104 may consult a database 118, such as a database or a list of trusted entities, to find the trusted mobile application 108 and/or an entity that provisioned the trusted mobile application 108 on the user device 102. Upon verification, the payment network cloud service system 104 may send a first payment token and a first cryptographic key to the trusted mobile application 108 (step S154 in FIG. 1B). The first payment token may include a substitute account number used to identify the PAN without incorporating the actual PAN in the message. In some embodiments, the trusted mobile application 108 may conduct a payment transaction with the merchant computer 116 using the first token.

Using the first cryptographic key, the trusted mobile application 108 may create an identity verification cryptogram (step S156 in FIG. 1B). That is, the trusted mobile application 108 may encrypt the user data (i.e. account credentials) using the first cryptographic key. Any suitable encryption process may be used including DES, triple DES, AES, etc. The trusted mobile application 108 may send the identity verification cryptogram to a storage accessible by both the trusted mobile application 108 and the untrusted mobile application 110 (step S158 in FIG. 1B). For example, the trusted mobile application 108 may send the identity verification cryptogram to the mobile OS provider cloud storage system 106. The mobile OS provider cloud storage system 106 may be accessible by the particular user device 102 and an account username associated with the user device 102. Thus, access to the mobile OS provider cloud storage system 106 may be restricted to the user of the user device 102 according to the security systems of the mobile OS. For example, the mobile OS provider cloud storage system 106 may be accessible by the particular user device 102 (e.g. a mobile phone of the user) and any other device (e.g. a tablet or a laptop of the user) by providing a specific account username and corresponding passcode. The mobile OS provider cloud storage system 106 may store the identity verification cryptogram (step S160 in FIG. 1B).

One of ordinary skill in the art will appreciate that foregoing features from the various embodiments may be combined in any suitable manner including using cryptographic keys and verification cryptograms in different configurations than are provided explicitly in each illustrative system described herein. For example, instead of the trusted mobile application 108 providing the account credentials directly to the payment network cloud service system 104, the trusted mobile application 108 may include a payment network cloud service system software development kit (SDK) to contact the payment network cloud service system 104.

In some embodiments, instead of the trusted mobile application 108 providing data directly to the payment network cloud service system 104, the trusted mobile application 108 may contact a trusted cloud service (e.g. a mobile banking cloud service), which in turn may contact the payment network cloud service system 104 on behalf of the trusted mobile application 108.

Yet in other embodiments, instead of providing the first token directly to the trusted mobile application 108, the payment network cloud service system 104 may provide the first token to the mobile banking cloud service, which in turn may provide the first token to the trusted mobile application 108 on behalf of the payment network cloud service system 104.

Referring back to FIGS. 1A and 1B, the user may wish to use the untrusted mobile application 110 to conduct a transaction. The user may activate the untrusted mobile application 110 and make a request to share account credentials (e.g. user data) with a untrusted entity, such as a merchant operating the merchant computer 116. If the user wishes to use the payment account issued by the issuer computer 112, the user may be required to authenticate the untrusted mobile application 110 with the payment network cloud service system. To that end, the untrusted mobile application 110 may submit the identity verification cryptogram generated by the trusted mobile application 108 hosted on the same user device 102 along with account credentials of the user.

Using the user device 102, the user may authenticate himself to the mobile OS provider cloud storage system 106 by providing the information required by the mobile OS security such as an account username and password. One of ordinary skill in the art will appreciate that the user may authenticate himself using other techniques, such as biometrics, voice recognition, and the like. When the user is authenticated at the mobile OS provider cloud storage system 106, the untrusted mobile application 110 may request the identity verification cryptogram from the mobile OS provider cloud storage system 106 (step S162 in FIG. 1B). The untrusted mobile application 110 may generate and send a request to the mobile OS provider cloud storage system 106. The mobile OS provider cloud storage system 106 may then send the identity verification cryptogram stored in connection with the user (i.e. associated with the account username) back to the untrusted mobile application 110 (step S164 in FIG. 1B).

The untrusted mobile application 110 may provide the retrieved identity verification cryptogram along with account credentials such as PAN, the expiration date, the name on the account, the billing address, the device identifier and the like to the payment network cloud service system 104 (step S166 in FIG. 1B). The payment network cloud service system 104 may decrypt the identity verification cryptogram to obtain decrypted credentials, may compare the decrypted credentials to the user data received from the untrusted mobile application 110 (step S168 in FIG. 1B). If the decrypted credentials match the user data received from the untrusted mobile application 110, the payment network cloud service system 104 may validate that the identity verification cryptogram is generated using the account credentials received from the untrusted mobile application 110. In some embodiments, the account credentials may be stored in a database 118. Upon receiving the identity verification cryptogram and the account credentials from the untrusted mobile application 110, the payment network cloud service system 104 may access the database 118 to retrieve the information stored in connection with the user device 102 and/or the user. The payment network cloud service system 104 may then compare the information retrieved from the database 118 with the account credentials and the identity verification cryptogram received from the untrusted mobile application 110. If there is a match, the payment network cloud service system 104 may verify that the identity verification cryptogram is created using the account credentials received from the untrusted mobile application 110. Upon verification, the payment network cloud service system 104 may send a second payment token and a second cryptographic key to the untrusted mobile application 110 (step S170 in FIG. 1B). The untrusted mobile application 110 may complete the transaction with the merchant computer 116 using the second payment token and a payment cryptogram generated using the second cryptographic key provided by the payment network cloud service system 104 (step S172 in FIG. 1B). The merchant computer 116 may process the payment transaction using the second payment token and the payment cryptogram (step S174 in FIG. 1B).

In some embodiments, step S172 in FIG. 1B may further include generating a transaction cryptogram using the second cryptographic key. The second cryptographic key may be a limited-use key (LUK) associated with a set of one or more limited-use thresholds that limits the usage of the LUK. Once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by the payment network cloud service system.

The set of one or more limited-use thresholds may include at least one of a time-to-live indicating the duration of time for which the LUK is valid, a predetermined number of transactions for which the LUK is valid, and/or a cumulative transaction amount indicating the total transaction amount summed across one or more transactions for which the LUK is valid, or any combination thereof. For example, a LUK may be valid for a time-to-live of five days, and a transaction conducted using that LUK after five days have elapsed since the LUK was generated may be declined. As another example, a LUK may be valid for a predetermined number of five transactions, and a sixth transaction (and any subsequent transaction) conducted using that LUK may be declined. As a further example, a LUK may be valid for a cumulative transaction amount of five hundred dollars, and a transaction conducted using the LUK after that LUK has already been used for transactions totaling more than five hundred dollars may be declined.

It should be understood that the limited usage values described above are just examples, and that other usage limits can be used. For example, the number of transactions usage limit can be set to a number in the range of 2 to 10 transactions, or a number in the range of 5 to 50 transactions, etc., and the cumulative transaction amount can be set to a value in the range of $100 to $5,000, or a value in the range of $10 to $1000, etc.

It should also be noted that in some embodiments, the number of transactions limited-use threshold can be set to one transaction such each LUK is valid for only one transaction. However, in some embodiments, the network bandwidth available to a user device may be limited, or the user device may not always have uninterrupted network connectivity. As such, the number of transactions limited-use threshold can be set to more than one transaction (e.g., five transactions) in some embodiments, for example, to reduce the frequency and amount of LUK replenishments over time, and hence reduce the amount of network traffic used by the user device over time.

Generation of the payment cryptogram is described next. The untrusted application 110 on the user device 102 may receive the second cryptographic key (e.g. a limited-use key (LUK)) that is associated with a set of one or more limited-use thresholds that limits the usage of the LUK. The LUK may be received from a remote computer (e.g., the payment network cloud service system 104). In some embodiments, the set of one or more limited-use thresholds may include at least one of a time-to-live indicating a time duration that the LUK is valid for, a predetermined number of transactions that the LUK is valid for, and/or a cumulative transaction amount indicating the total transaction amount that the LUK is valid for. In some embodiments, the set of one or more limited-use thresholds may include an international usage threshold and a domestic usage threshold.

According to some embodiments, the untrusted application 110 may also receive, with the LUK, a key index that includes information pertaining to generation of the LUK. For example, the key index may include time information indicating when the LUK is generated, a replenishment counter value indicating the number of times the LUK has been replenished, a pseudo-random number that is used as a seed to generate the LUK, a transaction counter value indicating the number of transactions that has been previously conducted by a mobile application of the communication device at the time the LUK is generated, and/or any combination thereof.

A transaction (e.g., a payment transaction, access transaction, or other transaction that is performed using an account) can be initiated with the merchant 116 through the untrusted application 110. The untrusted application 110 on the user device 102 may generate a transaction cryptogram using the LUK. This can be done in any suitable manner. For example, the LUK may be used to encrypt data that is specific to the user, the payment token, and/or the device that is being used to conduct the payment transaction. Such data might include the payment token, an expiration date, a payment account number, a current time, etc.

The untrusted application 110 may send the transaction cryptogram to an access device of the merchant 116 to conduct the transaction. In some embodiments, the untrusted application 110 may also send the second payment token to the access device to conduct the transaction. The transaction can be authorized based on at least whether usage of the LUK has exceeded the set of one or more limited-use thresholds and/or verification of the transaction cryptogram.

After conducting the transaction, if the set of one or more limited-use thresholds associated with the LUK has not been exhausted or exceeded (or is not about to be exhausted or exceeded), other transactions may be conducted using the transaction cryptogram. If the set of one or more limited-use thresholds associated with the LUK has been exhausted or exceeded (or is not about to be exhausted or exceeded), the untrusted application 110 may send a replenishment request for a new LUK to the payment network cloud service system 104. The replenishment request may be sent in response determining that the set of one or more limited-use thresholds associated with the LUK has been exhausted, or in response to determining that a next transaction conducted with the LUK will exhaust the set of one or more limited-use thresholds. In some embodiments, the replenishment request may be sent in response to receiving a push message requesting the communication device to replenish the LUK.

The replenishment request may include transaction log information derived from a transaction log (e.g., a transaction verification log) stored on the user device 102. In some embodiments, the transaction log stored on the user device 102 may include, for each transaction conducted using the LUK, a transaction timestamp indicating the time of the corresponding transaction, and/or an application transaction counter value associated with the corresponding transaction. In some embodiments, the transaction log information sent to the remote server may include an authentication code computed over at least the transaction log using the LUK. If the transaction log information in the replenishment request matches the transaction log information at the remote computer, a new LUK and a new key index associated with the new LUK may be sent to the untrusted application 110.

In some embodiments, the first cryptographic key used to generate the identification verification cryptogram may also be a LUK.

One of ordinary skill in the art will appreciate that foregoing features from the various embodiments may be combined in any suitable manner including using cryptographic keys and identity verification cryptograms in different configurations than are provided explicitly in each illustrative system described herein. For example, instead of the untrusted mobile application 110 retrieving the identity verification cryptogram from the mobile OS provider cloud storage system 106 and sending the identity verification cryptogram to the payment network cloud service system 104, the untrusted mobile application 110 may include a payment network cloud service system SDK that may contact the mobile OS provider cloud storage system 106 and/or the payment network cloud service system 104 on behalf of the untrusted mobile application 110.

In some embodiments, instead of the untrusted mobile application 110 providing data directly to the payment network cloud service system 104, the untrusted mobile application 110 may contact a mobile merchant/wallet cloud service, which in turn may contact the payment network cloud service system 104 on behalf of the untrusted mobile application 110.

Yet in other embodiments, instead of providing the second token direct to the untrusted mobile application 110, the payment network cloud service system 104 may provide the second token to a mobile merchant/wallet cloud service, which in turn may provide the second token to the untrusted mobile application 110 on behalf of the payment network cloud service system 104.

II. Identity Verification Method

According to various embodiments, the identity of a user may be established through a trusted mobile application and encrypted verification and/or identification data may be placed in a shared data store, such as a mobile OS provider cloud storage system. The encrypted data may be retrieved from the shared data store and used to verify the user identity through a untrusted mobile application.

Figure 2:
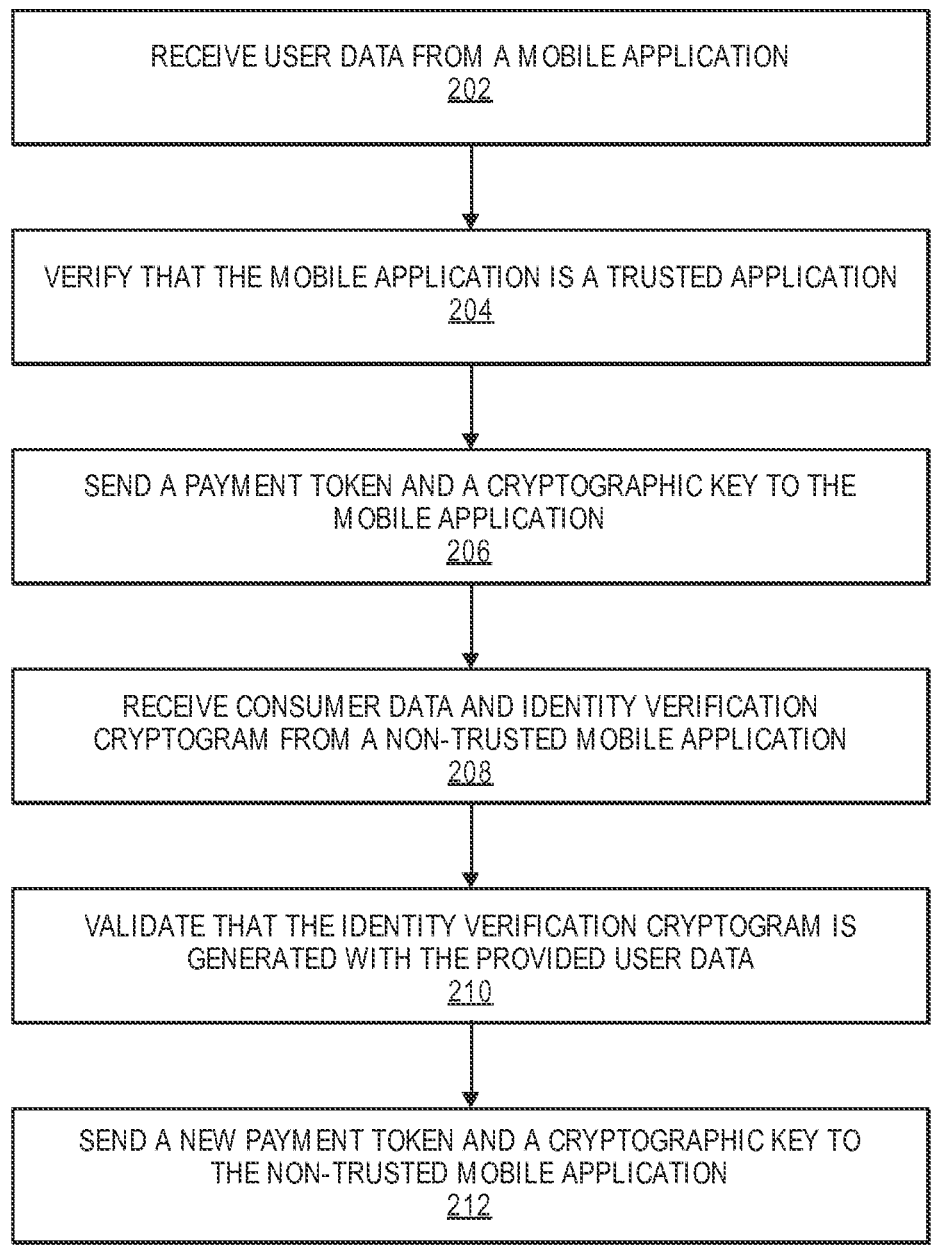
FIG. 2 shows a flow diagram of a method performed by a server computer cloud service for authenticating a user on multiple mobile applications provided on a user device according to various embodiments.

Referring now to FIG. 2, a flow diagram 200 of a method performed by a server computer providing a payment network cloud service system is provided. The payment network cloud service system receives user data (e.g. account credentials) from a first mobile application installed on a user device (step 202). As provided above, the user data may include one or more of the PAN, the expiration date, the name on the account, the billing address, the device identifier and the like. One of ordinary skill in the art will appreciate that the user data is not limited to the foregoing items and other type of data may be provided to help to verify the user. The payment network cloud service system may verify the identity of the user and may verify that the first mobile application is a trusted mobile application based on the user data provided by the first mobile application (step 204). Upon verification, the payment network cloud service system may send a first payment token and a first cryptographic key to the trusted mobile application (step 206).

The trusted mobile application may generate an identity verification cryptogram using the first cryptographic key and store the identity verification cryptogram at a storage accessible by the user device. For example, the identity verification cryptogram may be stored at the mobile OS provider cloud storage system. Storing the identity verification cryptogram at the mobile OS provider cloud storage system may provide an added level of security as the access to the mobile OS provider cloud storage system is generally restricted to an account username associated with the particular user and/or user device. In some embodiments, the user may access the mobile OS provider cloud storage system using the same account username on different user devices, such a mobile phone and a tablet of the user. This may conclude a first level of authentication where the payment network cloud service system verifies the user on the trusted mobile application.

For subsequent user verification/authentication purposes, the payment network cloud service system may leverage the authentication previously granted to the trusted mobile application for other mobile applications. Specifically, the payment network cloud service system may receive user data along with the identity verification cryptogram from a second mobile application, i.e. a untrusted mobile application (step 208). The untrusted mobile application may be stored on the same user device. The received user data may include one or more of the PAN, the expiration date, the name on the account, the billing address, the device identifier and the like. The identity verification cryptogram may be retrieved from the mobile OS provider cloud storage system by the untrusted application and provided to the payment network cloud service system. The payment network cloud service system may validate that the identity verification cryptogram is generated with the user data provided by the untrusted mobile application (step 210). Upon verification, the payment network cloud service system may send a second payment token and a second cryptographic key to the untrusted mobile application (step 212). The untrusted mobile application may generate a payment cryptogram using the second cryptographic key, and use the second payment token and the payment cryptogram to conduct a transaction with a merchant.

Figure 3:
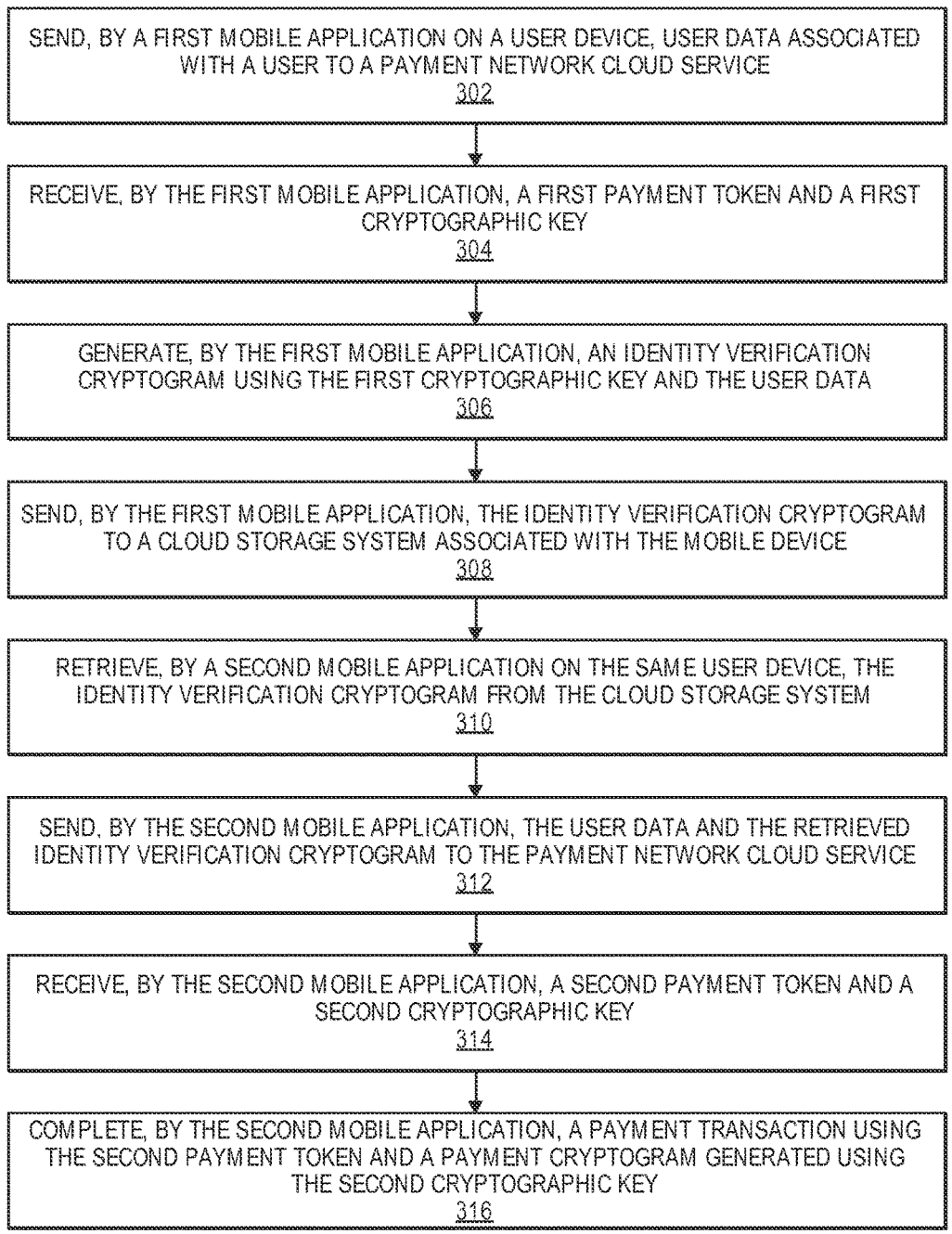
FIG. 3 shows a flow diagram of a method performed by multiple mobile applications on a user device for authenticating a user on the multiple mobile applications according to various embodiments.

Turning now to FIG. 3, a flow diagram 300 of a method performed by multiple mobile applications on a user device is provided. A first mobile application, e.g. a trusted mobile application, and a second mobile application, e.g. a untrusted mobile application, may be provided on a user device. The first mobile application may send user data associated with a user to a payment network cloud service system (step 302). The user data may include one or more of the PAN, the expiration date, the name on the account, the billing address, the device identifier and the like. The payment network cloud service system may authenticate the user using the user data and send confirmation results to the first mobile application. The first mobile application may receive a first payment token and a first cryptographic key from the payment network cloud service system (step 304). Using the first limited use cryptographic key and user data, the first mobile application generates an identity verification cryptogram (step 306). The first mobile application sends the identity verification cryptogram to be stored at a mobile OS provider cloud storage system (step 308).

When the user launches the second mobile application on the same user device, the second mobile application may need authorization from the payment network cloud service system prior to conducting a transaction. The previously generated identity verification cryptogram may be leveraged by the second mobile application for authentication. The second mobile application may retrieve the identity verification cryptogram from the mobile OS provider cloud storage system (step 310). The second mobile application may provide the identity verification cryptogram along with the user data to the payment network cloud service system (step 312). The user data may include one or more of the PAN, the expiration date, the name on the account, the billing address, the device identifier and the like. The payment network cloud service system may authenticate the user using the identity verification cryptogram and the user data. The payment network cloud service system may send confirmation results to the second mobile application. The second mobile application may receive a second payment token and a second cryptographic key from the payment network cloud service system (step 314). The second mobile application may generate a payment cryptogram using the second cryptographic key. Using the second payment token and the payment cryptogram, the second mobile application may complete a payment transaction with a merchant (step 316).

III. System Devices

The various participants and elements described herein with reference to FIGS. 1-3 may operate one or more computer apparatuses to facilitate the functions described herein.

Figure 4:
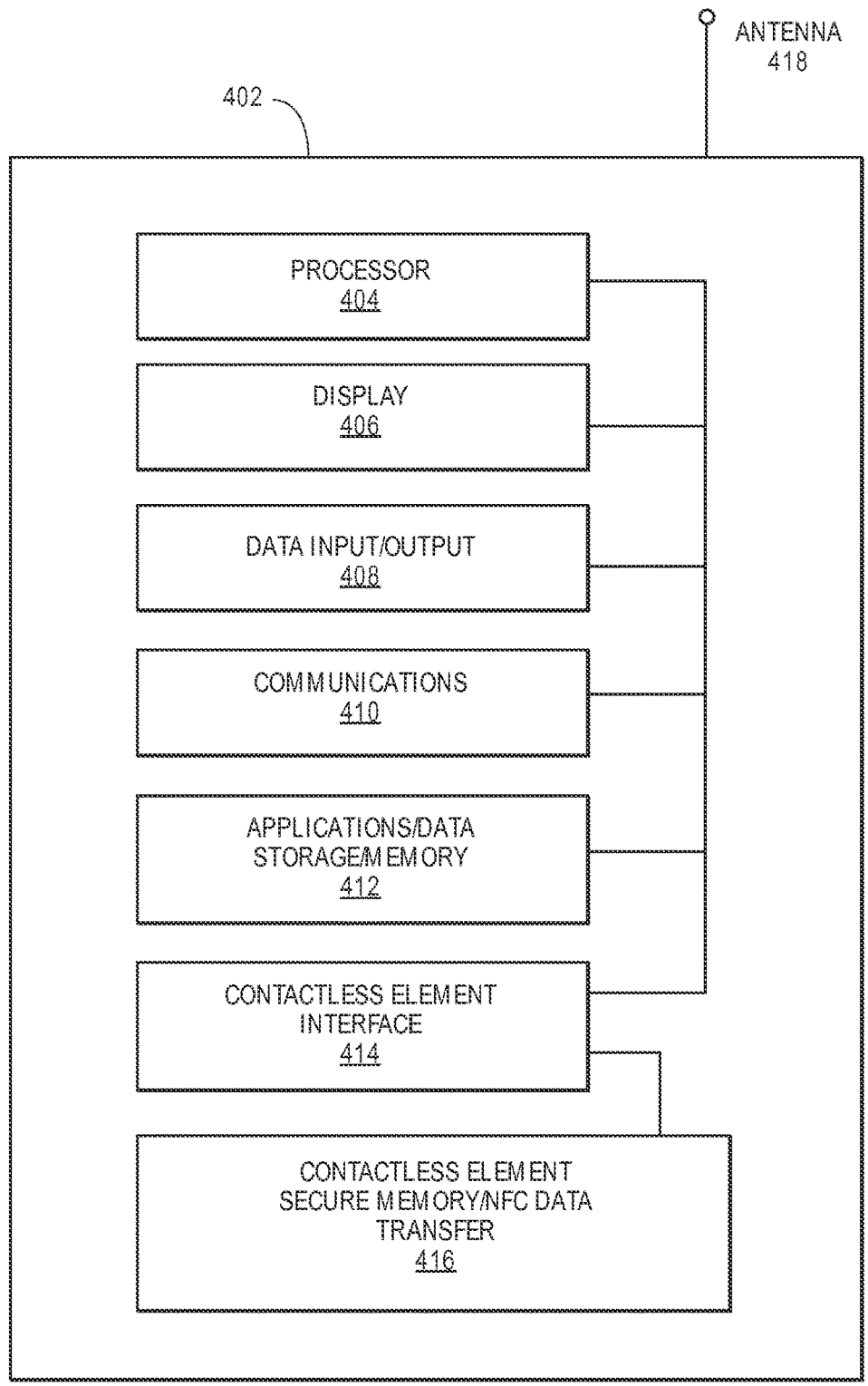
FIG. 4 is a block diagram of a portable communication device that may be used to implement the mobile banking and transaction matching operations disclosed herein, according to various embodiments.

FIG. 4 is a functional block diagram illustrating a user device in the form of a portable communication device that may be used to perform mobile banking operations, such as initiating transactions and receiving and displaying transaction alerts, in accordance with some embodiments of the present invention. Portable consumer device 402 may include circuitry that is used to enable certain device functions, such as telephony. The functional elements responsible for enabling those functions may include a processor 404 that is programmed to execute instructions that implement the functions and operations of the device. Processor 404 may access data storage 412 (or another suitable memory region or element) to retrieve instructions or data used in executing the instructions. Data input/output elements 408 may be used to enable a user to input data (via a microphone or keyboard, for example) or receive output data (via a speaker, for example). Display 406 may also be used to output data to a user. Communications element 410 may be used to enable data transfer between device 402 and a wireless network (via antenna 418, for example) to assist in enabling telephony and data transfer functions. Device 402 may also include contactless element interface 414 to enable data transfer between contactless element 416 and other elements of the device, where contactless element 416 may include a secure memory and a near field communications data transfer element (or another form of short range communications technology).

As noted, a mobile phone or similar device is an example of a portable communication device that may be used to display alerts as described with reference to embodiments of the present invention. However, other forms or types of user devices may be used without departing from the underlying concepts of the invention. Further, devices that are used to display alerts may not require the capability to communicate using a cellular network in order to be suitable for use with embodiments of the present invention.

Any of the elements in FIGS. 1-3, including any servers or databases, may use any suitable number of subsystems to facilitate the functions described herein.

Figure 5:
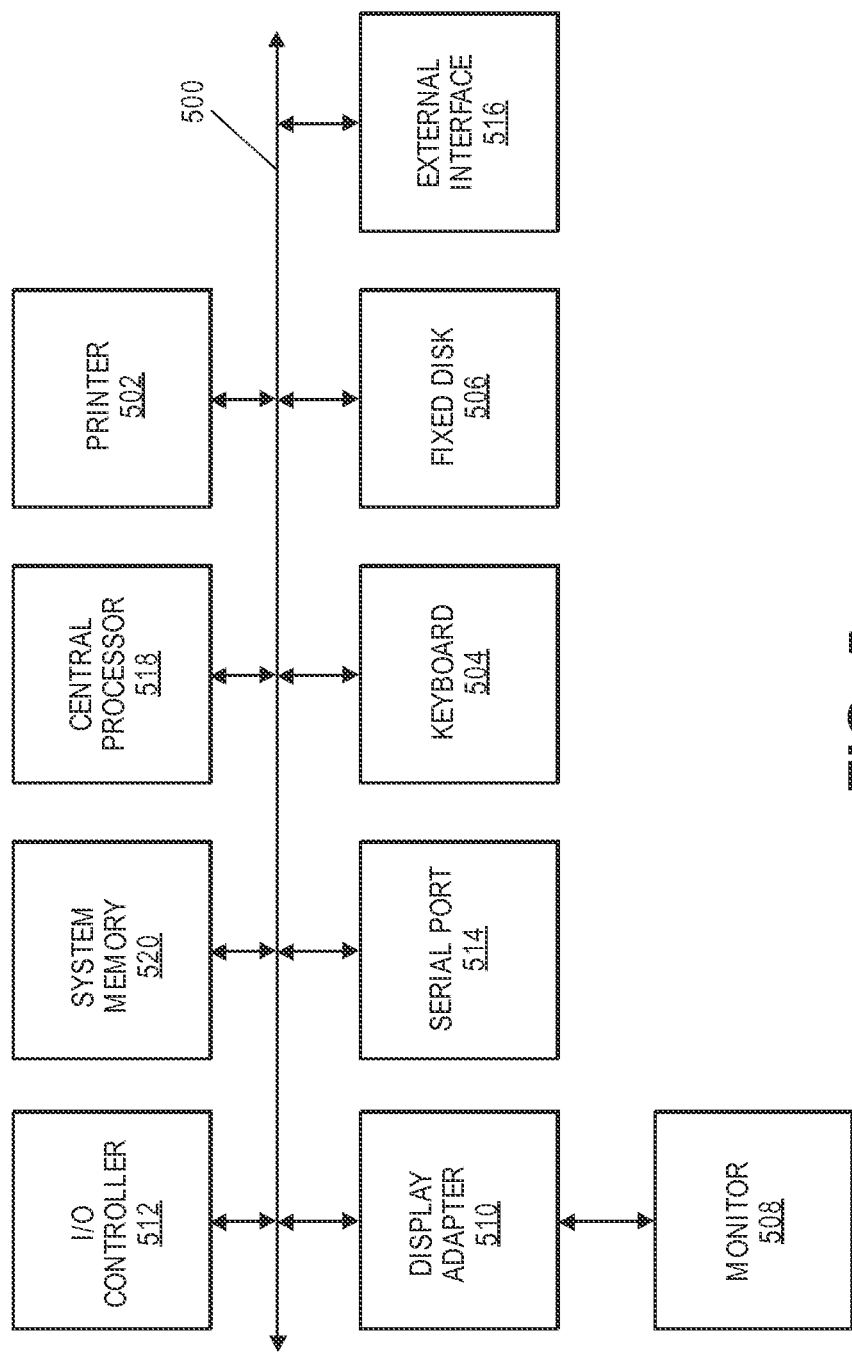
FIG. 5 shows an exemplary computer system according to embodiments of the present invention.

Examples of such subsystems or components are shown in FIG. 5. The subsystems shown in FIG. 5 are interconnected via a system bus 500. Additional subsystems such as a printer 502, keyboard 504, fixed disk 506 (or other memory comprising computer readable media), monitor 508, which is coupled to display adapter 510, and others are shown. Peripherals and input/output (I/O) devices, which couple to I/O controller 512 (which can be a processor or other suitable controller), can be connected to the computer system by any number of means known in the art, such as serial port 514. For example, serial port 514 or external interface 516 can be used to connect the computer apparatus to a wide area network such as the Internet, a mouse input device, or a scanner. The interconnection via system bus allows the central processor 518 to communicate with each subsystem and to control the execution of instructions from system memory 520 or the fixed disk 506, as well as the exchange of information between subsystems. The system memory 520 and/or the fixed disk 506 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, at a server computer, user data associated with a user from a first mobile application;
determining, by the server computer, that the first mobile application is a trusted application provisioned in a secure execution environment of a mobile device by an issuer of an account;

authenticating, by the server computer, the user based on the user data;

sending, by the server computer, a first cryptographic key to the first mobile application after authenticating the user, wherein an identity verification cryptogram is generated by the first mobile application using the first cryptographic key;

receiving, at the server computer, the user data associated with the user and the identity verification cryptogram generated by the first mobile application from a second mobile application, wherein the first mobile application and the second mobile application are stored on the same mobile device of the user;

validating, by the server computer, that the identity verification cryptogram is generated using the user data and the first cryptographic key previously sent by the server computer to the first mobile application; and sending, by the server computer, a token and a second cryptographic key to the second mobile application upon validating the identity verification cryptogram generated by the first mobile application, wherein the token represents account information of the account issued by the issuer, and wherein the second mobile application completes a transaction using the token and a transaction cryptogram generated by the second mobile application using the second cryptographic key.

2. The method of claim 1, wherein the user data includes a device identifier.

3. The method of claim 2, further comprising:
determining, using the device identifier, that the first mobile application and the second mobile application are stored on the same mobile device.

4. The method of claim 1, wherein the identity verification cryptogram is stored at a cloud storage system.

5. The method of claim 1, wherein the identity verification cryptogram is stored on a cloud storage system of an operating system provider of the mobile device.

6. The method of claim 1, further comprising:
sending another token to the first mobile application along with the first cryptographic key.

7. A system comprising:
a mobile device storing a first mobile application and a second mobile application; and
a server computer including:
a processor; and
a computer readable medium coupled to the processor, the computer readable medium comprising code, when executed by the processor, causes the processor to:
receive user data associated with a user from the first mobile application;
determine that the first mobile application is a trusted application provisioned in a secure execution environment of the mobile device by an issuer of an account;
authenticate the user based on the user data;
send a first cryptographic key to the first mobile application after authenticating the user, wherein an identity verification cryptogram is generated by the first mobile application using the first cryptographic key;
receive the user data associated with the user and the identity verification cryptogram generated by the first mobile application from the second mobile application;
validate that the identity verification cryptogram is generated using the user data and the first cryptographic key previously sent by the server computer to the first mobile application; and
send a token and a second cryptographic key to the second mobile application upon validating the identity verification cryptogram generated by the first mobile application, wherein the token represents account information of the account issued by the issuer,
wherein the second mobile application completes a transaction using the token and a transaction cryptogram generated by the second mobile application using the second cryptographic key.

8. The system of claim 7, wherein the user data includes a device identifier.

9. The system of claim 8, wherein the code, when executed by the processor of the server computer, further causes the processor of the server computer to:
determine, using the device identifier, that the first mobile application and the second mobile application are stored on the same mobile device.

10. The system of claim 7, wherein the identity verification cryptogram is stored at a cloud storage system.

11. The system of claim 7, wherein the identity verification cryptogram is stored on a cloud storage system of an operating system provider of the mobile device.

12. The system of claim 7, wherein the code, when executed by the processor of the server computer, further causes the processor of the server computer to:
send another token to the first mobile application along with the first cryptographic key.

13. A method comprising:
authenticating, by a first mobile application on a user device, a user on the user device;
sending, by the first mobile application on the user device, user data associated with the user to a server computer, wherein the first mobile application is a trusted application provisioned in a secure execution environment of the user device by an issuer of an account;
receiving, by the first mobile application on the user device, a cryptographic key from the server computer;
generating, by the first mobile application on the user device, an identity verification cryptogram using the cryptographic key;
storing, by the first mobile application on the user device, the identity verification cryptogram on a cloud storage system of an operating system provider of the user device;
retrieving, by a second mobile application on the user device, the identity verification cryptogram generated by the first mobile application from the cloud storage system;
sending, by the second mobile application on the user device, the user data associated with the user and the identity verification cryptogram generated by the first mobile application to the server computer;
receiving, by the second mobile application on the user device, a token from the server computer, wherein the token represents account information of the account issued by the issuer; and
completing, by the second mobile application on the user device, a transaction with the token.

14. The method of claim 13, wherein the user data includes a device identifier.

15. The method of claim 13, further comprising:
receiving, by the first mobile application on the user device, another token along with the cryptographic key.

16. The method of claim 13, further comprising:
receiving, by the second mobile application on the user device, another cryptographic key along with the token, wherein the transaction is completed with the token and the another cryptographic key.

17. The method of claim 16, further comprising:
generating, by the second mobile application on the user device, a transaction cryptogram using the another cryptographic key; and
sending, by the second mobile application on the user device, the token and the transaction cryptogram to an access device to complete the transaction.

* * * * *